(12) United States Patent
Dreps et al.

(10) Patent No.: US 9,558,139 B2
(45) Date of Patent: *Jan. 31, 2017

(54) SYSTEM INTERCONNECT DYNAMIC SCALING HANDSHAKE USING SPARE BIT-LANE

(71) Applicant: INTERNATIONAL BUSINESS MACHINES CORPORATION, Armonk, NY (US)

(72) Inventors: Daniel Mark Dreps, Austin, TX (US); Frank D. Ferraiolo, Naples, FL (US); Anand Haridass, Bangalore (IN); Prasanna Jayaraman, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/462,278

(22) Filed: Aug. 18, 2014

(65) Prior Publication Data

US 2016/0048473 A1 Feb. 18, 2016

(51) Int. Cl.
*H04L 29/08* (2006.01)
*G06F 13/40* (2006.01)
*G06F 13/42* (2006.01)

(52) U.S. Cl.
CPC ....... *G06F 13/4027* (2013.01); *G06F 13/4221* (2013.01); *H04L 69/321* (2013.01);
(Continued)

(58) Field of Classification Search
None
See application file for complete search history.

(56) References Cited

U.S. PATENT DOCUMENTS

| 6,134,676 A | 10/2000 | VanHuben et al. |
| 6,496,925 B1 | 12/2002 | Rodgers et al. |

(Continued)

FOREIGN PATENT DOCUMENTS

| JP | 2009259217 A | 11/2009 |
| JP | 2011181006 A | 9/2011 |

OTHER PUBLICATIONS

U.S. Appl. No. 14/147,746, filed Jan. 6, 2014, Dreps, et al.

(Continued)

*Primary Examiner* — Kodzovi Acolatse
(74) *Attorney, Agent, or Firm* — Mitch Harris, Atty at Law, LLC; Andrew M. Harris; Steven L. Bennett

(57) ABSTRACT

A communications technique using spare bit-lanes to communicate changes in interface physical link layer bandwidth and/or active width provides for dynamic adjustment of power consumption of interface links without requiring a separate control path for exchanging the change information. One or more spare bit-lanes are used to communicate an indication of the operating frequency/active width change to the physical link layer of the remote side of the interface and an acknowledgement is sent back to provide complete handshaking of the operating characteristic change. The method can determine whether or not a spare bit-lane is available and prevent making the change if a spare bit-lane is not available until the interface is repaired and a spare bit-lane can then be used for communicating operating changes in operating frequency/active width.

10 Claims, 5 Drawing Sheets

(52) U.S. Cl.
CPC ........ *H04L 69/323* (2013.01); *Y02B 60/1228* (2013.01); *Y02B 60/1235* (2013.01)

(56) References Cited

U.S. PATENT DOCUMENTS

| | | | |
|---|---|---|---|
| 6,842,463 B1 | 1/2005 | Drwiega et al. | |
| 7,080,288 B2 | 7/2006 | Ferraiolo et al. | |
| 7,116,682 B1 | 10/2006 | Waclawsky et al. | |
| 7,117,126 B2 | 10/2006 | Floyd et al. | |
| 7,136,953 B1* | 11/2006 | Bisson | G06F 13/4018 |
| | | | 710/29 |
| 7,536,490 B2 | 5/2009 | Mao | |
| 7,613,126 B1 | 11/2009 | Natarajan et al. | |
| 7,721,039 B2 | 5/2010 | Irisa | |
| 7,760,643 B2 | 7/2010 | Kim et al. | |
| 7,809,869 B2 | 10/2010 | Atherton et al. | |
| 8,050,174 B2 | 11/2011 | Becker et al. | |
| 2003/0088799 A1 | 5/2003 | Bodas | |
| 2003/0202482 A1 | 10/2003 | Dittmann et al. | |
| 2005/0119860 A1 | 6/2005 | Hsu et al. | |
| 2008/0052426 A1* | 2/2008 | Montag | H04N 7/148 |
| | | | 710/62 |
| 2008/0263254 A1 | 10/2008 | Su et al. | |
| 2010/0082851 A1 | 4/2010 | Green et al. | |
| 2010/0162033 A1 | 6/2010 | Ahn et al. | |
| 2011/0055370 A1 | 3/2011 | Kern et al. | |
| 2011/0222111 A1 | 9/2011 | Shima | |
| 2012/0106539 A1 | 5/2012 | Ferraiolo et al. | |
| 2013/0007491 A1* | 1/2013 | Iyer | G06F 1/3206 |
| | | | 713/321 |
| 2013/0159761 A1 | 6/2013 | Baumgartner et al. | |
| 2013/0346722 A1 | 12/2013 | LaBerge et al. | |
| 2013/0346772 A1 | 12/2013 | Abou Gazala et al. | |
| 2014/0003451 A1* | 1/2014 | Wagh | H04L 41/0896 |
| | | | 370/468 |
| 2014/0301733 A1 | 10/2014 | Hu et al. | |

OTHER PUBLICATIONS

U.S. Appl. No. 14/253,916, filed Apr. 16, 2014, Dreps, et al.
U.S. Appl. No. 14/302,628, filed Jun. 12, 2014, Dreps, et al.
U.S. Appl. No. 14/299,415, filed Jun. 9, 2014, Dreps, et al.
List of IBM Patents or Patent Applications Treated as Related, 2 pages.
U.S. Appl. No. 14/464,924, filed Aug. 21, 2014, Dreps, et al.
Office Action in U.S. Appl. No. 14/464,924 mailed on Apr. 5, 2016, 14 pages (pp. 1-14 in pdf).

\* cited by examiner

SYSTEM INTERCONNECT DYNAMIC SCALING HANDSHAKE USING SPARE BIT-LANE

BACKGROUND OF THE INVENTION

1. Field of the Invention

The present invention relates generally to interconnected processing systems, and more particularly, to processing systems that dynamically control I/O interface performance and power consumption.

2. Description of Related Art

Interfaces within and between present-day integrated circuits have increased in operating frequency and width. In particular, in multiprocessing systems, both wide and fast connections are provided between many processing units. Data width directly affects the speed of data transmission between systems components, as does the data rate, which is limited by the maximum frequency that can be supported by an interface. However, such fast and wide interconnects are significant power consumers in a computer system formed from interconnected processing units.

The data width and/or operating frequency of the interconnects may be scaled in order to reduce power consumption when an interface is expected to be idle or have reduced bandwidth requirements for a period of time. However, in order for both ends of an interface to operate properly without requiring re-initialization, communication of changes to the data width and/or operating frequency of the interconnects need to be communicated across the interface. Additional control lanes may be provided for such communications, but require additional hardware and consequent cost.

It is therefore desirable to provide an interface, computer system and related computer programs that can control the data width and/or operating frequency of interface physical link layers in a multi-processing system without requiring additional control lanes.

BRIEF SUMMARY OF THE INVENTION

The above-mentioned objective of providing improved performance and/or power efficiency of a system interconnect physical layer between processing units is provided in an interface, a computer system and computer program products.

The interface, computer system and computer program products manage communications between a pair of physical link layers of an interface connecting processing units within a computer system. An active width and/or an operating frequency of a first one of the physical link layers is changed and an indication of the change is communicated to the second physical link layer over a spare bit lane of the interface. The other physical link layer receives the indication at the second one of the pair of physical link layers changing its active width and/or a operating frequency and communicates an acknowledgement to the first one of the physical link layers.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses techniques for synchronizing changes in the bandwidth, including the active width and/or operating frequency of physical link layers at either end of interfaces such as parallel busses or serial connections, that interconnect processing units in a processing system. When a change in active width and/or operating frequency is to be made at a first end of the interface, the new parameter information (e.g., new active width and/or operating frequency) is indicated to the other end of the interface by sending an indication message over a spare-bit lane that is part of the interface, but is not currently used in any operating mode. If a spare bit-lane is not available, the interface may be operated in a fixed operating mode (e.g., full operating frequency, full active width) until the interface is repaired. When the parameter change indication is received at the remote end of the interface, an acknowledgement is sent back, generally over the spare bit-lane(s). If the acknowledgement is not received at the end of the interface that initiated the change, the change is generally aborted. Also, if a problem is detected at start-up or in response to a failure detection, one of the interfaces can communicate to the other interface(s) an indication of the failure. In response each of the interfaces will subsequently operate with a predetermined "safe mode" active width and operating frequency.

Figure 1:
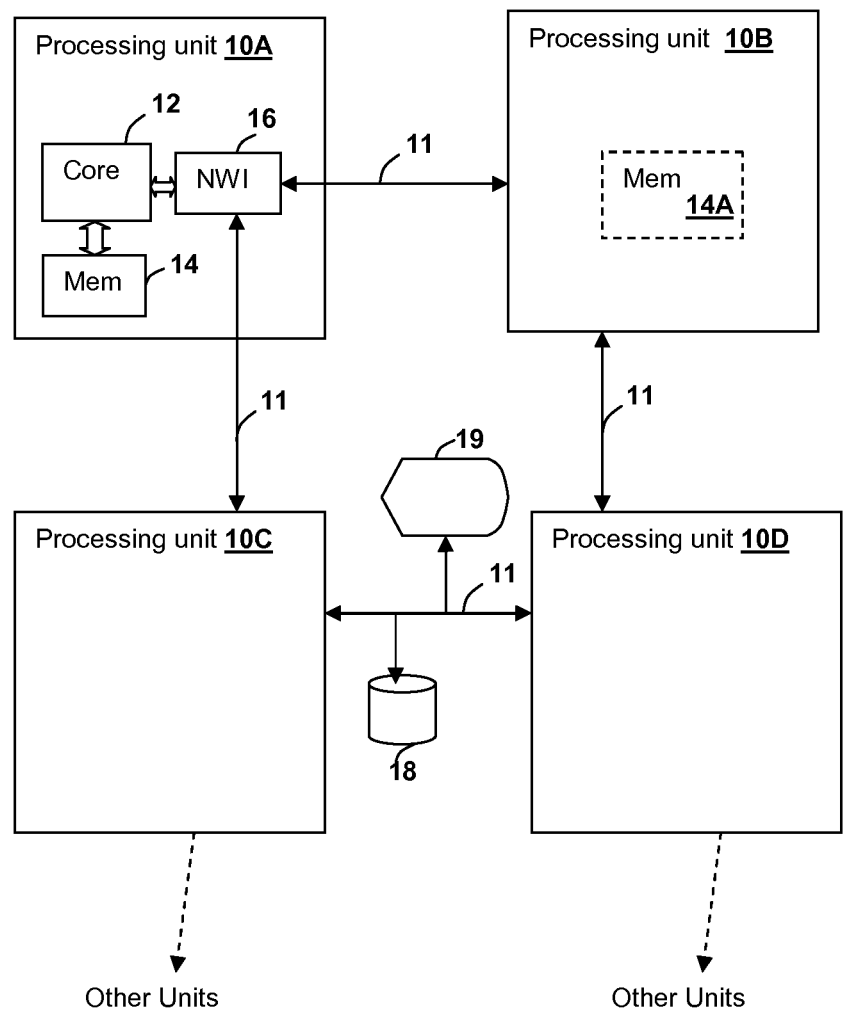
FIG. 1 is a block diagram of a computer system in which techniques in accordance with embodiments of the invention are implemented.

With reference now to the figures, and in particular with reference to FIG. 1, a distributed computer system in accordance with an embodiment of the present invention is shown. A first processing unit 10A includes a processor core 12 coupled to a memory 14 that stores program instructions for execution by processor core 12. The program instructions may include program instructions forming computer program products that perform portions of the techniques disclosed herein within processing units 10A-10D. Processing unit 10A also includes a network interface (NWI) 16 that couples processing unit 10A to interface links 11, which are wired or wireless links to other processing units 10B, 10C, and provide for access between processing unit 10A and resources such as a remote memory 14A within processing unit 10B. Links 11 have dynamically adjustable bandwidth/power consumption, which is controlled as disclosed below. Other processing units 10B-10D are of identical construction in the exemplary embodiment, but embodiments of the invention may be practiced in asymmetric distributed systems having processing units with differing features. The distributed computer system of FIG. 1 also includes other resources such as I/O devices 19, including graphical display devices, printers, scanners, keyboards, mice, which may be coupled to the links 11 or one of processing units 10A-10D. Processing units 10A-10D are also coupled to storage devices 18, for storing and retrieving data and program instructions, such as storing computer program products in accordance with an embodiment of the invention.

Figure 2:
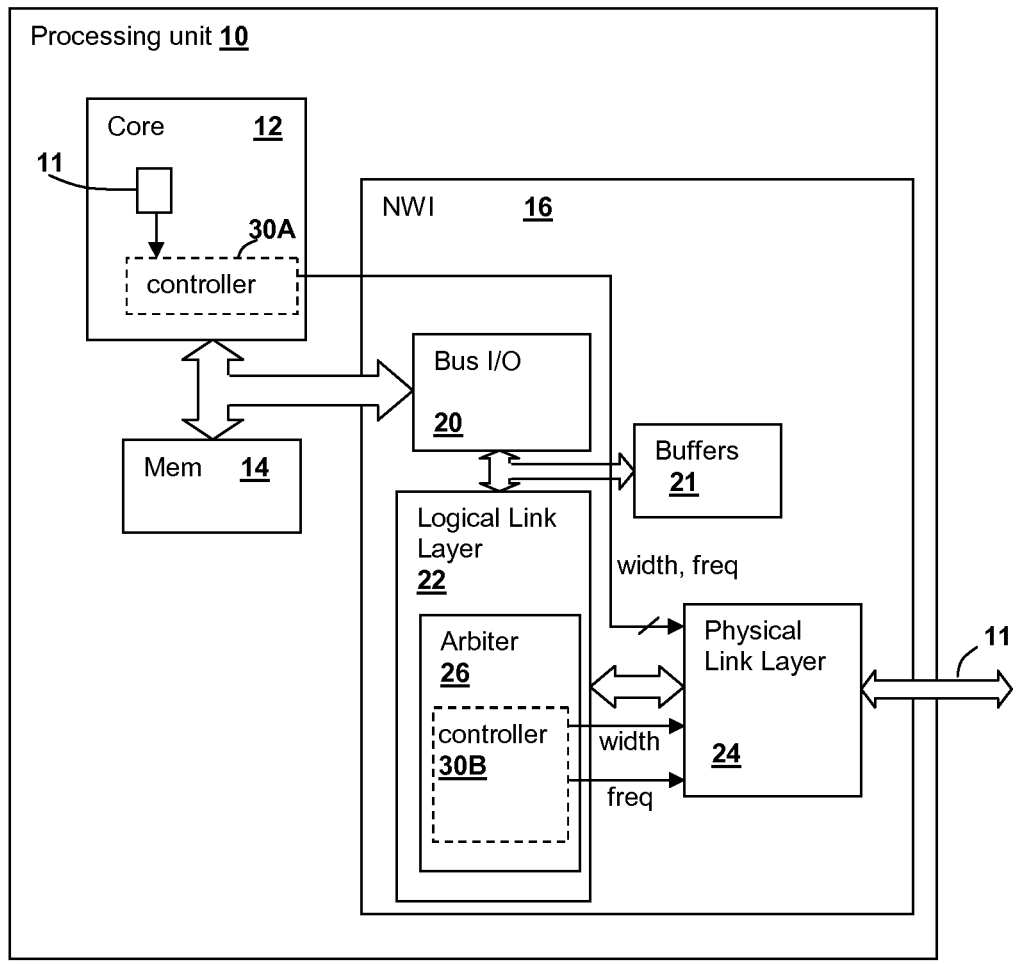
FIG. 2 is a block diagram showing details of a processing unit 10 that can be used to implement processing units 10A-10D of FIG. 1.

Referring now to FIG. 2, details within a processing unit 10 that can be used to implement processing units 10A-10D are shown. Within processing unit 10, controllers 30A, 30B are shown to illustrate two possible locations of a controller that manages the bandwidth of a physical link layer 24 of interface 11 according to a control value width and a control value freq that control the bandwidth of interface 11 by setting the active width, i.e., the number of active lanes and the operating frequency of interface 11. Controller 30A is located within core 12, while controller 30B is located within network interface (NWI) 16 coupled to core 12 and memory 14 by a bus I/O unit 20. Network interface 16 also includes buffers 21 for storing data transferred to and from bus I/O unit 20 by a logical link layer 22 of interface 11. By reducing the bandwidth of interface 11, either by reducing the number of active lanes, reducing the operating frequency or both, the power consumption of interface 11 can be reduced, as well as noise emissions and other effects produced by maintaining interface 11 in a full bandwidth operating mode. Control logic within one or more of controllers 30A, 30B detects events that are indicative of future external bus transactions that are likely to be issued over interface 11. Prediction of future external bus transactions may be performed as described in U.S. patent application Ser. No. 14/147,746, entitled "SYSTEM INTERCONNECT DYNAMIC SCALING BY PREDICTING I/O REQUIREMENTS" filed on Jan. 6, 2014, the disclosure of which is incorporated herein by reference. For example, controller 30A within core 12 may detect hardware events that correspond to operations that will generate I/O transactions over interface 11. System level events can be used to predict and trigger an increase in link bandwidth between the core on which the thread is running and the location of the remote memory, so that when the inevitable memory accesses by the thread occur, the link is operating at sufficient bandwidth. Examples of such events are such as a hypervisor executing within processing unit 10 starting a thread with an association to remote memory, or the association of remote memory to a running thread. Similarly, controller 30B within an arbiter 26 of logical link layer 22 may detect an event within logical link layer 22 indicating that the physical link layer 24 will soon need to be active for a number of transactions. In other embodiments of the invention, the adjustment in bandwidth of the interfaces may be made in response to actual requirements measurements, based on power management schemes, or determined in any manner suitable for balancing the power requirements of the system with the communications bandwidth requirements for the interfaces.

Figure 3:
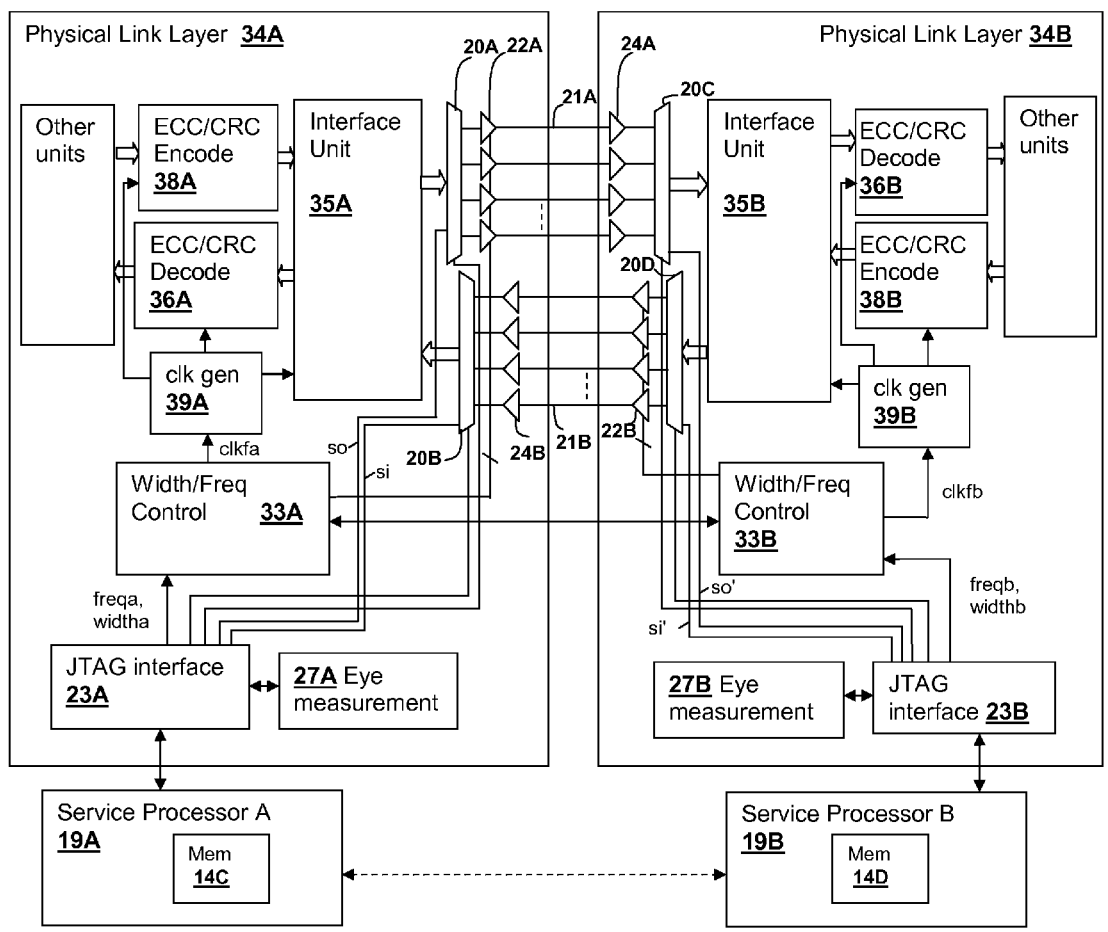
FIG. 3 is a block diagram of an interface connecting two processing blocks in the computer system of FIG. 1.

Referring now to FIG. 3, a bus interface is depicted connecting two physical link layers 34A and 34B, as might be implemented between processors 10A and 10B of FIG. 1. While physical link layers 34A and 34B are used to illustrate and support the data connection of two units, the techniques of the present invention extend to address, control and other signal types, as well as connection of memories, peripherals and other functional units within a computer system or other electronic device. The interface between physical link layers 34A and 34B is made by a physical connection of output signals 21A from physical link layer 34A to inputs of physical link layer 34B and from output interconnects 21B of physical link layer 34B to inputs of physical link layer 34A. The active width and/or operating frequency of physical link layers 34A and 34B are dynamically controllable to provide power savings when the full operating bandwidth available from interface 11 is not needed. Output interconnects 21A and 21B are received by interface units 35A and 35B, which include receivers 24A and 24B that provide signals to selectors 20C and 20B. In the interface depicted in FIG. 3, some of the bit-lanes provided by interconnects 21A and 21B are not used for operational communications, but rather are provided as spares. The present invention is directed toward use of unselected bit-lanes to communicate control information including indications of change in active width/operating frequency of physical link layers 34A-34B, as will be described in further detail below. Another pair of selectors 20A and 20D route data from the outputs of interface units 35A and 35B respectively, to driver circuits 22A and 22B, respectively according to which of the bit-lanes are selected as operating bit-lanes. Selectors 20A-20D may be implemented as described in detail in U.S. Pat. No. 8,050,174 entitled "SELF HEALING CHIP-TO-CHIP INTERFACE." At the opposing ends of the bus interface, receivers 24A and 24B receive the output signals provided from driver circuits 22A and 22B, respectively. Some of the spare bit-lanes may be inactive and all of the bit-lanes may be in an inactive low-power operating mode, but at least one of the spare bit-lanes is available for transmission and reception of control information to synchronize operating parameters between physical link layers 34A-34B, including at least one of an active width and operating frequency. The actual data transmitted between processor 10A and processor 10B is carried by the operating bit-lanes, which are in a subset of interconnects 21A and 21B. The signals from the operating bit-lanes are routed to the appropriate inputs of interface units 35A, 35B by selector circuits 20B and 20C, respectively.

Within physical link layers 24A and 24B, input signals are received by interface units 35A and 35B, features of which may include features as described in detail the above-incorporated U.S. Patent "SELF HEALING CHIP-TO-CHIP INTERFACE", in U.S. Pat. No. 7,117,126 entitled "DATA PROCESSING SYSTEM AND METHOD WITH DYNAMIC IDLE FOR TUNABLE INTERFACE CALIBRATION" and in U.S. Pat. No. 7,080,288 entitled "METHOD AND APPARATUS FOR INTERFACE FAILURE SURVIVABILITY USING ERROR CORRECTION." The disclosures of above-referenced U.S. Pat. Nos. 7,117,126 and 7,080,288 are also incorporated herein by reference. The outputs of interface units 35A and 35B are provided to error checking and correction (ECC) and/or cyclic-redundancy check (CRC) decode units 36A and 36B that are capable of detecting and correcting. Driver circuits 22A and 22B are preferably provided on-chip (but could be located off-chip) and receive ECC/CRC encoded data from ECC/CRC encode units 38A and 38B that provide the proper correctable bit patterns for transmission between physical link layers 24A and 24B over interface connections 31A and 31B. EI units 35A, 35B contain control logic and buffers that permit operation of the bus interface over a wide frequency variation, e.g., a range of 1.25:1. However, the clock that determines the operating frequency of interface 11 may be altered by a much wider range (e.g., 1×, 2×, 4×) as will be described in further detail below.

Eye measurement circuits 27A and 27B evaluate the edge positions of the received data so that the program that controls the frequency of the interface and the allocation of spare bit-lanes is enabled to determine whether performance margins are met for current operating conditions. Eye measurement circuits 27A and 27B are also used to evaluate each of the bit-lanes during initialization and calibration of the interface for selecting which of the spare bit-lanes will be allocated as spares and which will be allocated as operating bit-lanes. JTAG Interfaces 23A and 23B provide a mechanism for controlling and checking the results of the tests performed by eye measurement circuits 27A and 27B, as well as other control, maintenance and test functions within processors 10A and 10B, such as the selection of the operating bit-lanes by programming selectors 20A-20D, control of the operating frequency and active width of the interface via control signals freqa, freqb, widtha and widthb as described in further detail below. JTAG Interfaces 23A and 23B are each coupled to one of service processors 19A and 19B (which may be alternatively the same shared service processor) for controlling operations such performance margin evaluations, control of the bandwidth of the interface, and signaling changes in the interface operating parameters over spare bit-lane(s), according to program instructions stored in corresponding one of memories 14C, 14D. The program instructions carry out one or more of the methods as described herein. Alternatively control logic in the form of a state machine may provide the selection, communication and measurement control functions. Service processors 19A and 19B include memories for storing the program instructions and data needed to carry out the above-listed operations. In the exemplary embodiment depicted in FIG. 3, a spare bit-lane input connection si and a spare bit-lane output connection so are provided between JTAG interface 23A and selectors 20A and 20B, respectively, so that one or more spare bit-lanes may be used for communication with JTAG interface 23B of physical link layer 34B, which is connected to selectors 20D and 20C by a spare bit-lane input connection si' and a spare bit-lane output connection so', respectively. The illustrative embodiment provides the spare bit-lane communications signals to selectors 20A and 20D, and thereby uses at least one of drivers 22A and 22B to perform the control communications as described herein, requiring at least those drivers and corresponding ones of receivers 24A,24B to be active at least during the communications. However, alternative lower-power drivers and receivers can be coupled directly to the bit-lane conductor(s) to perform the control communications, in which case the corresponding one(s) of drivers 22A, 22B and receivers 24A,24B can be powered-down or placed in a inactive power-saving state. As mentioned above, if a problem is detected at start-up, e.g., by one of eye measurement circuits 27A and 27B detecting that the signals received by receivers 24A,24B are not operating with proper margins at the starting operating frequency, service processors 19A and 19B can communicate over the spare bit-lanes to set the active width and operating frequency of the interface to the predetermined safe mode active width and operating frequency.

In addition to the spare bit-lanes described above, to control the power consumption of physical link layers 24A and 24B some of output signals 21A and 21B, corresponding to "lanes" of the interface, may be disabled, providing the adjustable active width of the interface as mentioned above. For example, a 64-bit interface 11 may support a 32-bit, 16-bit and 8-bit mode in addition to a full-width 64-bit mode. When lanes are disabled, both the corresponding driver circuits 32A and 32B and corresponding receivers 34A and 34B can be powered-down, reducing power consumption directly. Additionally other logic, such as logic and buffers within elastic interface units 35A-35B, ECC/CRC encode units 38A-38B and ECC/CRC decode units 36A-36B can be simplified/powered-down when lanes are deactivated to provide even further power savings. As mentioned above, alternatively or in combination, the operating frequency of interface 11 may be adjusted by changing the clock frequency generated by clock generators 39A and 39B, as long as both ends of interface 11 are informed to operate at the same frequency by selecting the same control value for clock selection signals clkfA and clkfB provided to clock generators 39A and 39B, respectively. Alternatively, separate transmit and receive clock outputs from clock generators 39A and 39B can be provided for transmit and receive circuits within physical link layers 24A and 24B, so that output signals 31A can be operated at one interface operating frequency and that output signals 31B can be separately operated at a second interface operating frequency. Information is shared between interface width/frequency control units 33A-33B via the control communications described below, to ensure that the receiver side of interface units 35A, 35B and ECC/CRC Decode units 36A-36B are provided with the proper clock to match the clock provided to the transmit side of interface unit 35A, 35B in the other one of physical link layers 24A and 24B.

Figure 4:
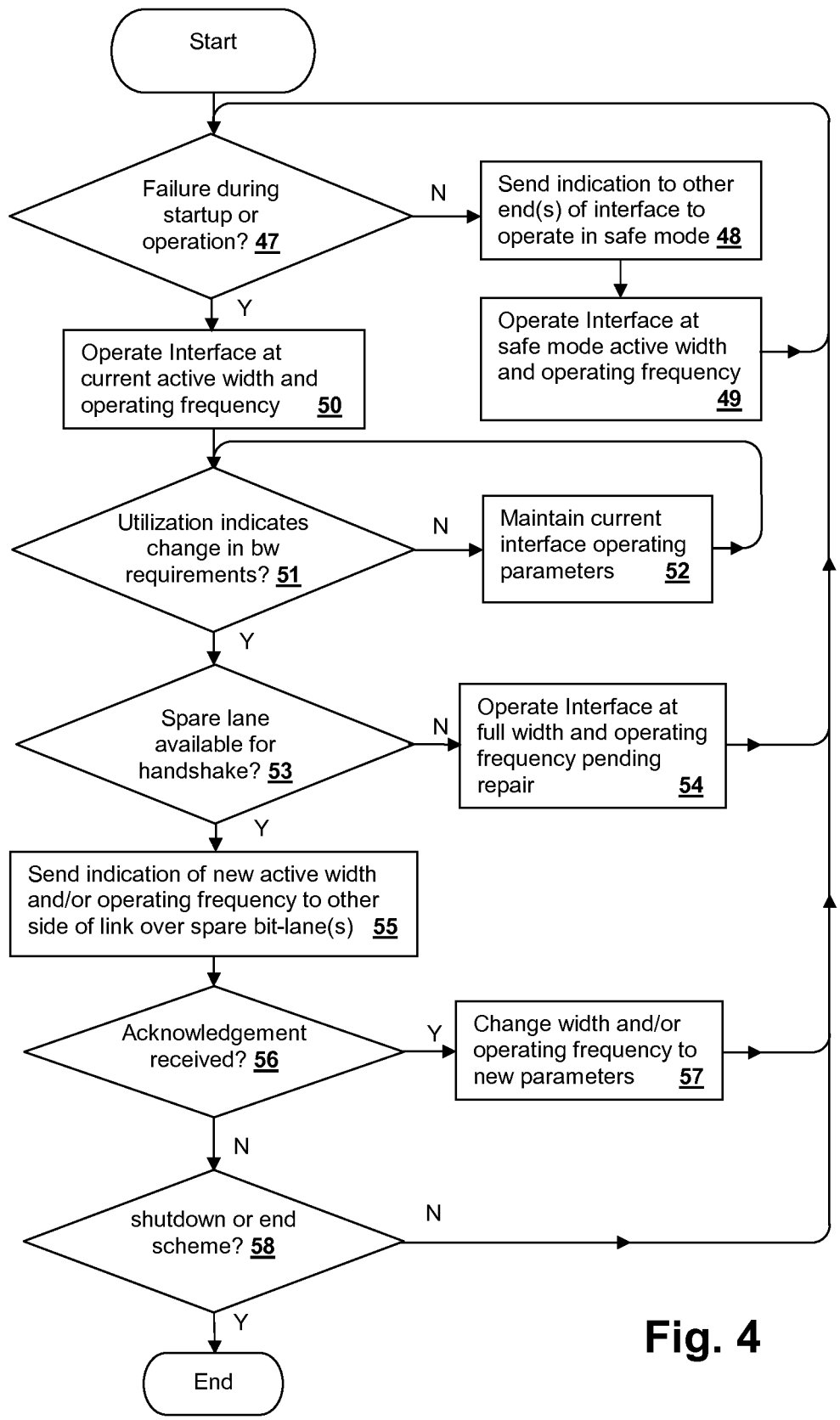
FIG. 4 is a flowchart showing a portion of an exemplary method of operating an interface.

Referring now to FIG. 4, a portion of a method of operating an interface physical link layer is illustrated in a flowchart. If a failure is detected during startup or subsequent operation (decision 47), then an indication is sent to the other end(s) of the interface to operate in safe mode (step 48) and) the interface is operated at the predetermined safe mode interface width and frequency (step 49). If there is no failure present (decision 47), the interface is operated at the currently selected interface width and frequency (step 50). If the utilization of the interface indicates a change in bandwidth requirements (decision 51) and a spare bit-lane is available for communications handshaking between the two ends of the interface (decision 53), then a change of a interface bandwidth can proceed. Otherwise, if the utilization of the interface indicates no change in bandwidth requirements (decision 51), the current operating parameters for the interface are maintained (step 52). Also, if a spare bit-lane is not available for communications handshaking between the two ends of the interface (decision 53), then the interface is operated at full operating frequency and active width pending repair of the interface (step 54). If the change in interface bandwidth can proceed, then the initiating interface sends an indication of a new active width and/or operating frequency to the other side of the interface over one or more spare bit-lanes (step 55). If an acknowledgement is received from the other side of the interface (decision 56) then the active width and/or operating frequency is changed to the new parameters (step 57). Otherwise, the change is not applied. Until the scheme is ended or the system is shut down (decision 58), steps 50-57 are repeated.

Figure 5:
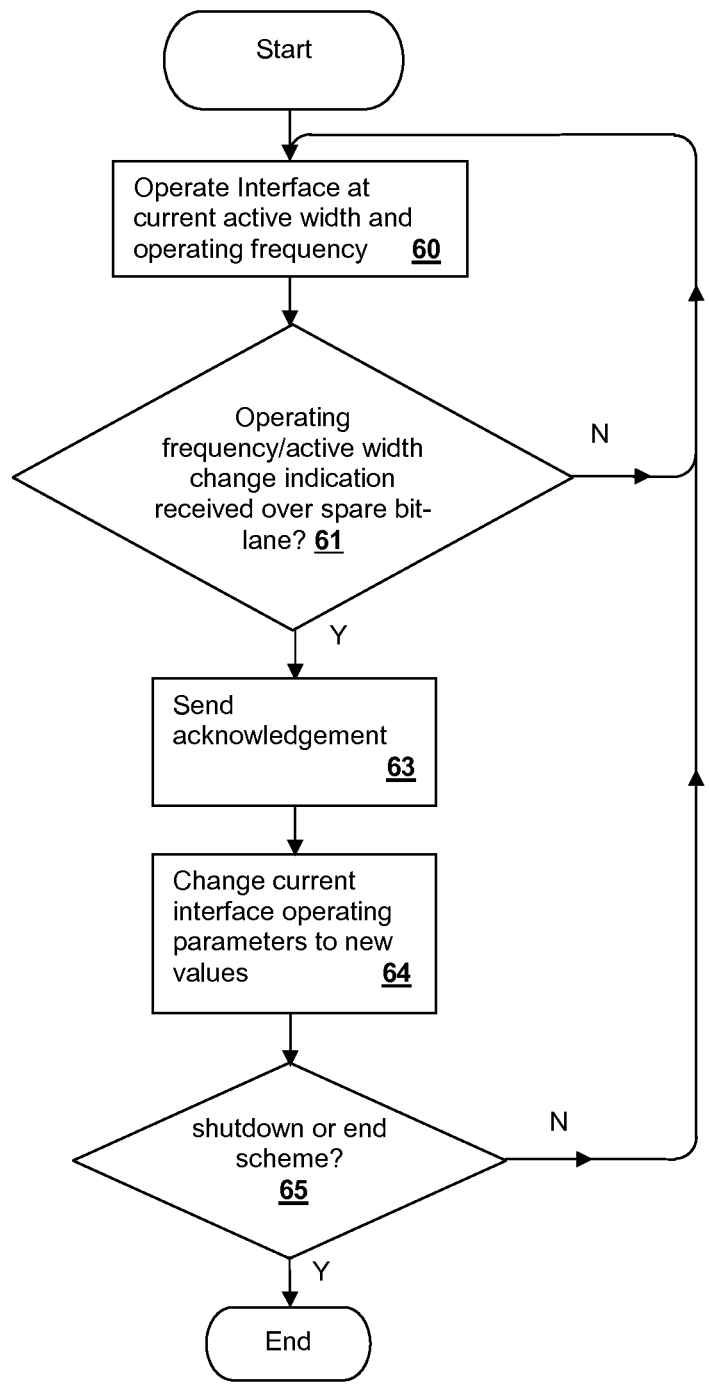
FIG. 5 is a flowchart showing another portion of the exemplary method of operating an interface.

Referring now to FIG. 5, another portion of the method of operating the interface physical link layer is illustrated in a flowchart, which may provide a specific implementation for the reception of the communications sent in step 55 of FIG. 4 and the sending of the acknowledgement that is received in step 56 of FIG. 4. Until a change indication is received over the spare bit-lane(s) (decision 61), the interface is operated at the currently selected interface width and frequency (step 60). If a change indication is received (decision 61), an acknowledgement is sent to the originating side of the interface over the spare bit-lane(s) (step 63) and the current interface operating parameters are set to their new values as indicated in the indication (step 64). Until the scheme is ended or the system is shut down (decision 65), steps 60-64 are repeated.

As noted above, portions of the present invention may be embodied in a computer program product, e.g., a program executed by a processor having program instructions that direct some or all of the operations outlined above. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per Se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A communications interface for connecting processing units within a computer system, the interface comprising:
  a first physical link layer within a first one of the processing units and comprising a first transceiver and a first control circuit;
  a second physical link layer within a second one of the processing units and comprising a second transceiver and a second control circuit;
  a plurality of bit-lanes connecting the first transceiver of the first physical link layer transceiver and the second transceiver of the second physical link layer, wherein the first control circuit changes at least one of a first active width or a first operating frequency of first transceiver to at least one of a second active width or a second operating frequency and communicates an indication of the at least one of the second active width or the second operating frequency to the second control circuit over a spare bit lane of the interface, wherein the spare bit lane is a lane that is not in use for the communicating of data between the first physical link layer and the second physical link layer, and wherein the second control circuit receives the indication, and in response, changes at least one of an active width or an operating frequency of the second transceiver to the at least one of the second width or the second operating frequency and communicates an acknowledgement to the first control circuit that indicates that the second transceiver is operating with the at least one of the second width or the second operating frequency as changed in response to receiving the indication, wherein subsequent to the second control circuit changing the second active width of the interface, the interface has a current active width less than a maximum active width of the interface, whereby one or more bit-lanes are disabled, and wherein the second control circuit uses the one or more disabled lanes of the interface to communicate the acknowledgement, whereby the indication is communicated over the spare bit-lane, but the acknowledgement is not communicated over the spare bit-lane.

2. The communications interface of claim 1, wherein the first control circuit communicates the indication over a single spare bit-lane of the interface, and wherein the second control circuit communicates the acknowledgement over the same single spare bit-lane by the first control circuit and the second control circuit bi-directionally encoding the indication and the acknowledgement by time-division.

3. The communications interface of claim 2, wherein the first control circuit transmits a first command code along with the indication to the second physical link layer, and wherein the second control circuit transmits a second acknowledgement code to the first physical link layer, whereby other information can be transmitted on the single spare bit-lane.

4. The communications interface of claim 1, wherein the second control circuit determines whether or not the current active width of the interface is less than the maximum active width, wherein the second control circuit uses the one or more disabled lanes selectively in response to determining that the current active width of the interface is less than the maximum active width, and wherein the second control circuit uses the spare bit lane selectively in response to determining that current active width of the interface is not less than the maximum active width.

5. A computer system comprising:
  a plurality of processing units;
  a plurality of interfaces, wherein the plurality of interfaces comprise a pair of physical link layers including a transceiver and a control circuit, wherein the pair of physical link layers comprise and a plurality of bit-lanes connecting the transceivers of the pair of physical link layers, wherein a control circuit of a first one of the pair of physical link layers changes at least one of a first active width or a first operating frequency of corresponding transceiver to at least one of a second active width or a second operating frequency and communicates an indication of the at least one of the second active width or the second operating frequency to the control circuit of the other one of the pair of physical link layers over a spare bit lane of the interface, wherein the spare bit lane is a lane that is not in use for the communicating of data between the pair of physical link layers, and wherein the control circuit of the other one of the pair of physical link layers receives the indication, and in response, changes at least one of an active width or an operating frequency of the transceiver of the other one of the pair of physical link layers to the at least one of the second width or the second operating frequency and communicates an acknowledgement to the control circuit of the first one of the physical link layers that indicates that the transceiver of the other one of the physical link layers is operating with the at least one of the second width or the second operating frequency as changed in response to receiving the indication, wherein subsequent to the control circuit of the second one of the physical link layers changing the second active width of the interface, the interface has a current active width less than a maximum active width of the interface, whereby one or more bit-lanes are disabled, and wherein the control circuit of the second one of the physical link layers uses the one or more disabled lanes of the interface to communicate the acknowledgement, whereby the indication is communicated over the spare bit-lane, but the acknowledgement is not communicated over the spare bit-lane.

6. The computer system of claim 5, wherein the control circuit of the first one of the physical link layers communicates the indication over a single spare bit-lane of the interface, and wherein the control circuit of the second one of the physical link layers communicates the acknowledgement over the same single spare bit-lane by the first control circuit and the second control circuit bi-directionally encoding the indication and the acknowledgement in a time-division multiplex.

7. The computer system of claim 6, wherein the control circuit of the first one of the physical link layers transmits a first command code along with the indication to the second physical link layer, and wherein the control circuit of the second one of the physical link layers transmits a second acknowledgement code to the first one of the physical link layers, whereby other information can be transmitted on the single spare bit-lane.

8. The computer system of claim 5, wherein the control circuit of the second one of the physical link layers determines whether or not the current active width of the interface is less than the maximum active width, wherein the control circuit of the second one of the physical link layers uses the one or more disabled lanes selectively in response to determining that the current active width of the interface is less than the maximum active width, and wherein the control circuit of the second one of the physical link layers uses the spare bit lane selectively in response to determining that current active width of the interface is not less than the maximum active width.

9. A communications interface for connecting processing units within a computer system, the interface comprising:
a first physical link layer within a first one of the processing units and comprising a first transceiver and a first control circuit;
a second physical link layer within a second one of the processing units and comprising a second transceiver and a second control circuit;
a plurality of bit-lanes connecting the first transceiver of the first physical link layer transceiver and the second transceiver of the second physical link layer, wherein the first control circuit changes at least one of a first active width or a first operating frequency of first transceiver to at least one of a second active width or a second operating frequency and communicates an indication of the at least one of the second active width or the second operating frequency to the second control circuit over a spare bit lane of the interface, wherein the first control circuit communicates the indication over a single spare bit-lane of the interface, and wherein the second control circuit communicates the acknowledgement over the same single spare bit-lane by the first control circuit and the second control circuit bi-directionally encoding the indication and the acknowledgement by time-division, wherein the first control circuit determines whether or not the single spare bit-lane is available and, responsive to determining that the single spare bit-lane is available, communicates the indication and changes the at least one of the first active width or the first operating frequency of first transceiver, wherein in response, the second control circuit changes the at least one of the active width or the operating frequency of the second transceiver and communicates the acknowledgement, and wherein the first control circuit, responsive to determining that the single spare bit-lane is not available, maintains the first active width and the first operating frequency at their respective maximum values, and does not communicate the indication, nor change the at least one of the first active width nor the first operating frequency of first transceiver, wherein the second control circuit thereby does not change the at least one of the second active width nor the second operating frequency of the second transceiver, whereby dynamic control of an active width and an operating frequency of the interface is disabled until the interface is repaired and a spare bit-lane becomes available, wherein the spare bit lane is a lane that is not in use for the communicating of data between the first physical link layer and the second physical link layer, and wherein the second control circuit receives the indication, and in response, changes at least one of an active width or an operating frequency of the second transceiver to the at least one of the second width or the second operating frequency and communicates an acknowledgement to the first control circuit that indicates that the second transceiver is operating with the at least one of the second width or the second operating frequency as changed in response to receiving the indication.

10. A computer system comprising:
a plurality of processing units;
a plurality of interfaces, wherein the plurality of interfaces comprise a pair of physical link layers including a transceiver and a control circuit, wherein the pair of physical link layers comprise and a plurality of bit-lanes connecting the transceivers of the pair of physical link layers, wherein a control circuit of a first one of the pair of physical link layers changes at least one of a first active width or a first operating frequency of corresponding transceiver to at least one of a second active width or a second operating frequency and communicates an indication of the at least one of the second active width or the second operating frequency to the control circuit of the other one of the pair of physical link layers over a spare bit lane of the interface, wherein the control circuit of the first one of the physical link layers communicates the indication over a single spare bit-lane of the interface, and wherein the control circuit of the second one of the physical link layers communicates the acknowledgement over the same single spare bit-lane by the first control circuit and the second control circuit bi-directionally encoding the indication and the acknowledgement in a time-division multiplex, wherein the control circuit of the first one of the physical link layers determines whether or not the single spare bit-lane is available and, responsive to determining that the single spare bit-lane is available, communicates the indication and changes the at least one of the first active width or the first operating frequency of the first one of the physical link layers, wherein in response, the control circuit of the second one of the physical link layers changes the at least one of the active width or the operating frequency of the second transceiver and communicates the acknowledgement, and wherein the control circuit of the first one of the physical link layers, responsive to determining that the single spare bit-lane is not available, maintains the first active width and the first operating frequency at their respective maximum values, and does not communicate the indication, nor change the at least one of the first active width nor the first operating frequency of the first physical link layer, wherein the control circuit of the second one of the physical link layers thereby does not change the at least one of the second active width nor the second operating frequency of the second one of the physical link layers, whereby dynamic control of an active width and an operating frequency of the interface is disabled until the interface is repaired and a spare bit-lane becomes available, wherein the spare bit lane is a lane that is not in use for the communicating of data between the pair of physical link layers, and wherein the control circuit of the other one of the pair of physical link layers receives the indication, and in response, changes at least one of an active width or an operating frequency of the transceiver of the other one of the pair of physical link layers to the at least one of the second width or the second operating frequency and communicates an acknowledgement to the control circuit of the first one of the physical link layers that indicates that the transceiver of the other one of the physical link layers is operating with the at least one of the second width or the second operating frequency as changed in response to receiving the indication.

* * * * *